United States Patent
Nakamura (10) Patent No.: US 11,461,058 B2
(45) Date of Patent: Oct. 4, 2022

(54) PRINTER PERFORMING QUALITY DETERMINATION PROCESS TO DETERMINE QUALITY OF PRINTING RESULT

(71) Applicant: BROTHER KOGYO KABUSHIKI KAISHA, Nagoya (JP)

(72) Inventor: Mitsuru Nakamura, Nagoya (JP)

(73) Assignee: BROTHER KOGYO KABUSHIKI KAISHA, Mizuho-ku (JP)

(*) Notice: Subject to any disclaimer, the term of this patent is extended or adjusted under 35 U.S.C. 154(b) by 0 days.

(21) Appl. No.: 17/196,528

(22) Filed: Mar. 9, 2021

(65) Prior Publication Data
US 2021/0303218 A1 Sep. 30, 2021

(30) Foreign Application Priority Data
Mar. 31, 2020 (JP) .............................. JP2020-064855

(51) Int. Cl.
*G06F 3/12* (2006.01)

(52) U.S. Cl.
CPC ............ *G06F 3/121* (2013.01); *G06F 3/1243* (2013.01)

(58) Field of Classification Search
CPC ...... G06F 3/121; G06F 3/1243; G06F 3/1259; G06F 3/1285; G06F 3/1208
See application file for complete search history.

(56) References Cited

U.S. PATENT DOCUMENTS

| 2017/0357470 A1* | 12/2017 | Kouguchi | ............. G06F 3/1208 |
| 2018/0253578 A1* | 9/2018 | Zhao | ........................ G06K 5/02 |

FOREIGN PATENT DOCUMENTS

| EP | 3509285 A1 * | 7/2019 | ........... G06F 3/1208 |
| JP | 2013-001106 A | 1/2013 | |
| JP | 2015-123619 A | 7/2015 | |
| JP | 2017-007111 A | 1/2017 | |

* cited by examiner

*Primary Examiner* — Juan M Guillermety
(74) *Attorney, Agent, or Firm* — Baker Botts L.L.P.

(57) ABSTRACT

In a printer, the printing portion prints an image in a printing area of the sheet conveyed by a conveyer. The reader reads the image in the printing area printed by the printing portion. In a case that the printing portion is to print images in a plurality of printing areas of the sheet, the controller sets, as at least one target printing area, a part of the plurality of printing areas. The controller determining whether a printing result in each of the at least one target printing area satisfies a prescribed quality based on image data which is generated by reading the printing result by using the reader.

14 Claims, 11 Drawing Sheets

CONVEYING TIME Tm > INSPECTION TIME T

FIG. 6B

CONVEYING TIME Tm ≒ INSPECTION TIME T

FIG. 6C

CONVEYING TIME Tm < INSPECTION TIME T

PRINTER PERFORMING QUALITY DETERMINATION PROCESS TO DETERMINE QUALITY OF PRINTING RESULT

CROSS REFERENCE TO RELATED APPLICATION

This application claims priority from Japanese Patent Application No. 2020-064855 dated Mar. 31, 2020. The entire content of the priority application is incorporated herein by reference.

TECHNICAL FIELD

The present disclosure relates to a printing device such as a label printer.

BACKGROUND

A label printer is known in the art as one type of printing device. The label printer uses a roll of paper configured of a long strip of printing paper wound into a roll shape and prints images on labels (printing areas) arranged adjacent to each other on the printing paper along the longitudinal direction of the same.

One such label printer is provided with a print head for printing images on the printing paper, and a reading device disposed downstream of the print head for reading the images printed on the printing paper and generating image data. The label printer determines the quality of the printing results based on the image data generated by the reading device.

SUMMARY

However, it is difficult for the conventional label printer to maintain printing speed while determining the quality of printing results for all labels.

In view of the foregoing, it is an object of the present disclosure to provide a printing device that can detect poor quality printing results without a decrease in printing speed.

In order to attain the above and other objects, the disclosure provides a printer. The printer includes a conveyer, a printing portion, a reader, and a controller. The conveyer is configured to convey a sheet in a conveying direction. The printing portion is configured to print an image in a printing area of the sheet conveyed by the conveyer. The reader is located downstream of the printing portion in the conveying direction, the reader being configured to read the image in the printing area printed by the printing portion. The controller is configured to perform: in a case that the printing portion is to print images in a plurality of printing areas of the sheet, setting, as at least one target printing area, a part of the plurality of printing areas; and determining whether a printing result in each of the at least one target printing area satisfies a prescribed quality based on image data which is generated by reading the printing result by using the reader.

BRIEF DESCRIPTION OF THE DRAWINGS

The particular features and advantages of the disclosure as well as other objects will become apparent from the following description taken in connection with the accompanying drawings, in which.

DETAILED DESCRIPTION

An embodiment of the present disclosure will be described while referring to attached drawings.

Label Printer

Figure 1:
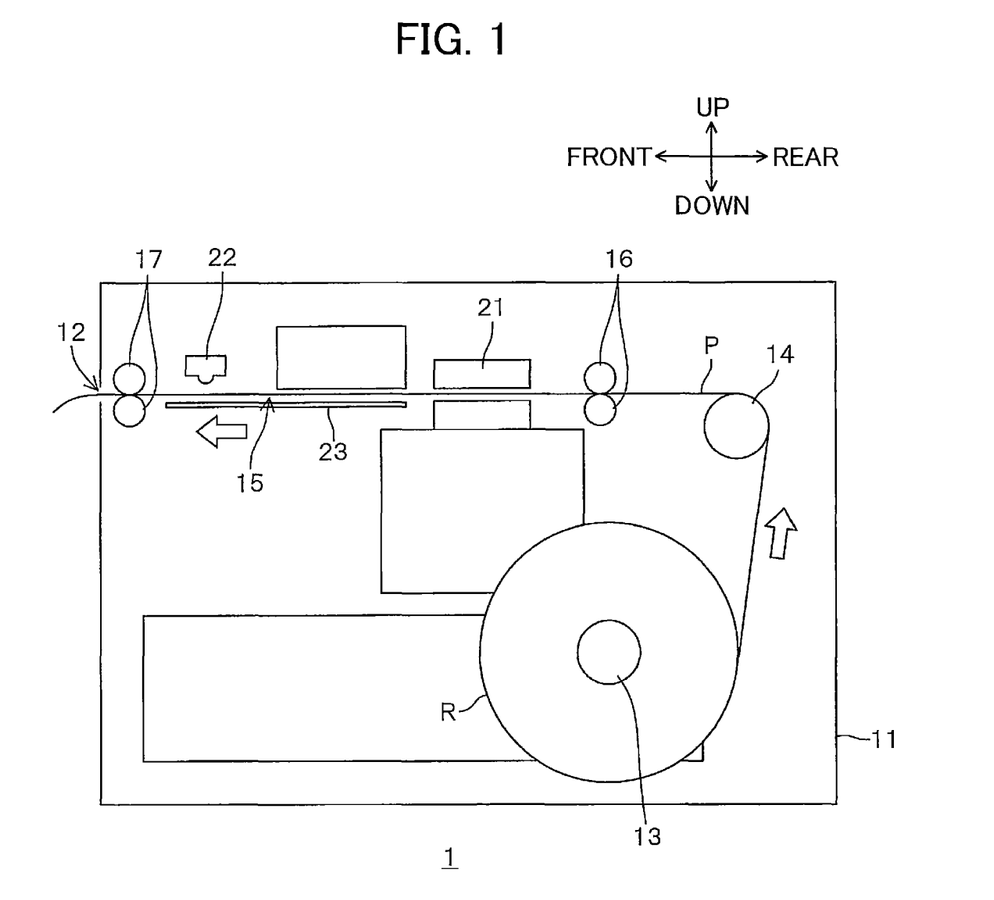
FIG. 1 is a cross section illustrating a label printer according to an embodiment.

FIG. 1 shows a label printer 1. The label printer 1 has a casing 11 that forms the outer shell of the label printer 1. A tape outlet 12 is formed in a side surface of the casing 11. The label printer 1 is a device that prints images on a continuous strip of label paper P and discharges the printed label paper P from the casing 11 through the tape outlet 12.

In the following description, the front, rear, left, and right sides of the label printer 1 are defined based on the perspective of a user facing the front side of the label printer 1. The front side of the label printer 1 is defined as the side in which the tape outlet 12 is formed. The top and bottom of the label printer 1 are defined based on the state of the label printer 1 resting on a level surface. The cross-sectional view shown in FIG. 1 is a view from the right side of a cross section taken along a plane extending through the label printer 1 in the front-rear direction.

The label paper P may be a die-cut paper configured of labels affixed to a continuous base paper in a juxtaposition in the longitudinal direction of the base paper. Alternatively, the label paper P may be a non-fixed-length paper (a continuous paper) configured of continuous normal paper having a background image preprinted on the printing surface thereof. Here, the background image defines printing areas arranged at regular intervals. Alternatively, the label paper P may be a non-fixed-length paper configured of a normal paper or thermal paper having no background image printed thereon. The die-cut paper has an adhesive surface for each label and a printing surface on the side opposite the adhesive surface that constitutes the printing area. With non-fixed-length paper having no background image, printing areas are not fixed but are determined based on data for the images being printed on the non-fixed-length paper. In other words, a printing area on a non-fixed-length paper having no preprinted background image is an area in which data for an image of each page included in the print data is to be printed.

The tape outlet 12 is a rectangular-shaped opening that is elongated in the left-right direction. The tape outlet 12 provides communication between the interior and exterior of the casing 11.

A roller holder 13 is provided in the casing 11 for holding the label paper P in the shape of a roll R. To form the roll R, the label paper P is wound about a core so that the printing surface faces outward. The roller holder 13 has a general columnar shape and the core of the roll R is fitted around the roller holder 13, enabling the roll R to be retained on the roller holder 13.

A direction-changing roller 14 is provided in the casing 11 to the upper-rear of the roller holder 13. A conveying path 15 along which the label paper P is conveyed is formed on the front side of the direction-changing roller 14. The conveying path 15 extends forward from the top of the direction-changing roller 14. The front end of the conveying path 15 communicates with the tape outlet 12. The label paper P is drawn off the roll R toward the rear side of the direction-changing roller 14 and wraps partially around the circumferential surface of the direction-changing roller 14 before continuing in the forward direction. The label paper P is conveyed forward through the conveying path 15 toward the tape outlet 12.

Pairs of conveying rollers 16 and 17 (examples of a conveyance portion) are provided along the conveying path 15 for conveying the label paper P. The conveying rollers 16 are disposed on the front side of the direction-changing roller 14 with a space formed therebetween, and the conveying rollers 17 are disposed on the rear side of the tape outlet 12 and the front side of the conveying rollers 16 and are spaced apart from the conveying rollers 16. With the label paper P interposed between the pairs of conveying rollers 16 and conveying rollers 17, a motor M (see FIG. 2) is driven to rotate forward to transmit a drive force to the conveying rollers 16 and 17. The conveying rollers 16 and 17 are rotated by the drive force and convey the label paper P along the conveying path 15 in a feed direction (conveying direction) toward the tape outlet 12. Further, when the motor M is driven in a reverse direction, the drive force of the motor M is transmitted to the roller holder 13, causing the core of the roll R to be rotated in the direction opposite the rotating direction when label paper P is being conveyed in the feed direction, thereby conveying the label paper P in a take-up direction opposite the feed direction (hereinafter also referred to as "rewinding the label paper P"). When the label paper P is conveyed in the take-up direction, the conveying rollers 16 and 17 are in an idle rotating state.

A print head 21 and a contact image sensor (CIS) unit 22 are arranged in order in the feed direction between the conveying rollers 16 and the conveying rollers 17.

The print head 21 is arranged to face the conveying path 15 from above. In a case that the label paper P is a non-fixed-length paper configured of die-cut paper or normal paper, for example, the print head 21 employs an inkjet recording system to print images on the printing surface of the label paper P conveyed along the conveying path 15. In a case that the label paper P is a non-fixed-length paper configured of thermal paper, the print head 21 employs a thermal recording system to record images on the printing surface of the label paper P. The position in the conveying path 15 vertically opposing the print head 21 is the printing position of the print head 21, i.e., the position at which the print head 21 can print. Thus, the print head 21 prints a partial image on the printing surface of the label paper P located at the printing position.

In the following description, the term "label" will be used to denote an area of the printing paper in which the print head 21 prints an image and will include a label on die-cut paper and a printing area on non-fixed-length paper.

The CIS unit 22 is disposed downstream of the print head 21 in the feed direction and faces the conveying path 15 from above. The CIS unit 22 reads the printing surface of the label paper P conveyed along the conveying path 15, for example. While not shown in the drawings, the CIS unit 22 has a built-in light source, a rod lens array, and a linear image sensor. The light source irradiates light in the form of a line onto the printing surface of the label paper P. The light is reflected off the printing surface, passes through the rod lens array, and is incident on the linear image sensor. Through this process, the CIS unit 22 reads one line worth of an original (a line extending in a main scanning direction) at the reading position of the CIS unit 22. The linear image sensor is configured of a plurality of imaging elements (image sensors) that are arranged in a single line along the main scanning direction. The image data read by each imaging element constitutes data for one pixel (a pixel value).

A platen 23 is provided between the conveying rollers 16 and conveying rollers 17. The platen 23 is arranged on the side opposite to the print head 21 and the CIS unit 22 with respect to the conveying path 15, and opposes the print head 21 and the CIS unit 22 from below. The top surface of the platen 23 (i.e., the surface that opposes the print head 21 and the CIS unit 22) is formed flat for supporting the bottom of the label paper P. The top surface of the platen 23 is black in color. The width of a line read by the CIS unit 22 in the main scanning direction is greater than the width of the label paper P in the main scanning direction.

Principal Parts of the Electrical Structure

Figure 2:
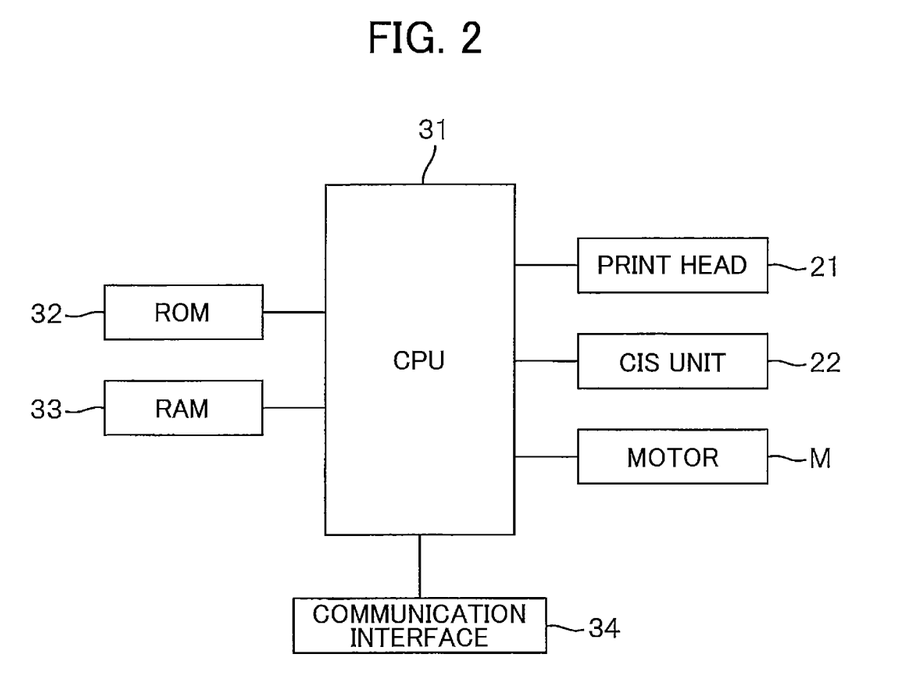
FIG. 2 is a block diagram illustrating electrical configuration of the label printer.

As shown in FIG. 2, the label printer 1 is provided with a central processing unit (CPU) 31, a read-only memory (ROM) 32, and a random-access memory (RAM) 33.

By executing programs for various processes, the CPU 31 (an example of a controller) controls the print head 21 and the CIS unit 22 and controls the motor M (an example of the conveyance portion) to drive the conveying rollers 16 and 17.

The ROM 32 is rewritable nonvolatile memory such as flash memory. The ROM 32 stores programs executed by the CPU 31, various data, and the like.

The RAM 33 is volatile memory such as dynamic random-access memory (DRAM). The RAM 33 is used as a work area in which the CPU 31 executes programs. The RAM 33 configures a step number counter. The step number counter increments (adds 1 to) a step number each time the motor M is driven one step. By controlling the drive of the motor M based on the number of steps counted by the step number counter, the CPU 31 can control the position of the label paper P.

The label printer 1 is also provided with a communication interface 34 for communicating with an external terminal such as a personal computer (PC). The communication interface 34 may be configured to communicate with the external terminal via wires, such as a Universal Serial Bus (USB) cable or a local area network (LAN) cable, or may be configured to communicate with the external terminal wirelessly through radio waves or the like.

Printing Process

When executing a print job on the label printer 1 to print images of shipping labels or the like on the label paper P, for example, a printer control command is generated for each page unit on the external terminal connected to and capable of communicating with the label printer 1. A printer control command is a command for controlling the label printer 1 to print an image. The command describes print data in a page description language. Print data includes information on the positions and types of characters, the positions of graphics, and the like in the image being printed. In a case that the content of the print job indicates that an image spanning a plurality of pages is to be printed on the label paper P, the external terminal generates a printer control command for each of the plurality of pages. Once the printer control commands have been generated on the external terminal, a function of a printer driver installed on the external terminal issues a command to execute the print job and subsequently transmits the printer control commands for all pages to the label printer 1 in order, beginning from the printer control command for the first page.

After receiving a printer control command from an external terminal via the communication interface 34, the CPU 31 executes a printing process. In the printing process, the CPU 31 drives the motor M to rotate forward. The forward drive of the motor M rotates the conveying rollers 16 and conveying rollers 17 and conveys the label paper P in the feed direction. The CPU 31 controls the print head 21 at the timing that the leading label reaches the printing position of the print head 21 and controls the print head 21 to print the image for the first page on the leading label provided on the printing surface of the label paper P. As with the first page, the CPU 31 controls the print head 21 to print the corresponding images for the second and subsequent pages at the timing that each subsequent label reaches the printing position of the print head 21.

Inspection Process

In parallel to the printing process, the CPU 31 of the label printer 1 executes an inspection process. The inspection process is performed to inspect an image printed on the label (hereinafter called the "printed image") to determine whether the printed image satisfies a given quality.

Figure 3:
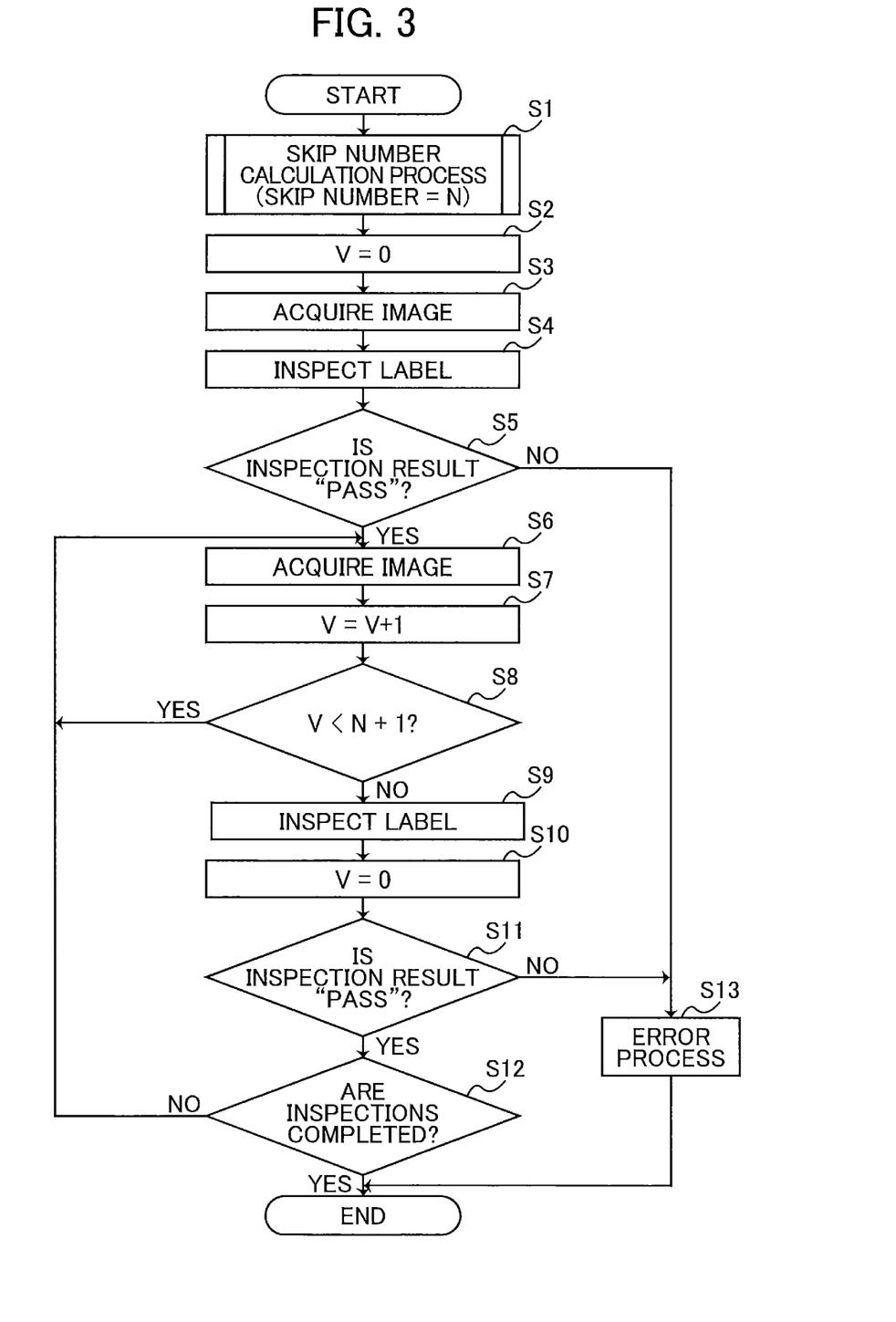
FIG. 3 is a flowchart illustrating an inspection process according to the embodiment.

In the inspection process, the CPU 31 does not simply inspect all labels on which images were printed, but rather inspects labels identified as inspection targets. For example, the CPU 31 inspects labels for every N-th page, where N is a prescribed skip number. FIG. 3 is a flowchart illustrating steps in the inspection process. At the start of the inspection process in S1 of FIG. 3, the CPU 31 executes a skip number calculation process to calculate the skip number N. The skip number calculation process will be described later.

After calculating the skip number in the skip number calculation process, in S2 the CPU 31 resets a count V to 0. The count V is the value of a skip label number counter used to count the number of labels for which inspection was skipped.

In the meantime, the CPU 31 controls the CIS unit 22 to read the printed image on each label in order beginning from the label of the first page (the first label). A set of data for the printed image read from each label by the CIS unit 22 is temporarily stored in the RAM 33. Since the RAM 33 has a limited storage capacity, the plurality of sets of data for the printed images is stored in a prescribed area of the RAM 33 according to the first in, first out (FIFO) method.

In S3 the CPU 31 acquires the set of data for the printed image on the label of the first page from the sets of data for the printed images read by the CIS unit 22 and in S4 inspects the label of the first page. Specifically, the CPU 31 determines whether the printed image of the label (the printing results) pass inspection or fail inspection based on the set of data read by the CIS unit 22. Here, "pass" indicates that the printing results meet the given quality, while "fail" indicates that the printing results do not meet the given quality. For example, when the image printed on the label includes a barcode symbol, the CPU 31 confirms whether optical properties (values of reflectance, reflection density, the print contrast signal (PCS), etc.) of the barcode symbol satisfy the relevant Japanese Industrial Standards (JIS) based on the set of data read by the CIS unit 22. For a label that includes a barcode in the printed image, the CPU 31 determines that the inspection result is "pass" in a case that the optical properties of the barcode symbol satisfy the JIS whereas the CPU 31 determines that the inspection result is "fail" in a case that the optical properties do not satisfy the JIS. These steps for inspecting a label are an example of a determination process.

In S5 the CPU 31 determines whether the inspection result for the label is "pass" or "fail." In a case that the inspection result is "pass" (S5: YES), in S6 the CPU 31 acquires a set of data for the printed image on the label of the next page. In S7 the CPU 31 increments (adds 1 to) the count V of the skip label number counter. In S8 the CPU 31 determines whether the count V just incremented for the skip label number counter is smaller than a value (N+1) obtained by adding 1 to the skip number N calculated in the skip number calculation process.

In a case that the count V is smaller than the value N+1 (S8: YES), the CPU 31 skips the inspection process for the current label and returns to S6 to acquire a set of data for the printed image on the label of the next page. Once again in S7 the CPU 31 increments the count V for the step number counter as described above, and in S8 determines whether the incremented count V is smaller than the value N+1.

In this way, the CPU 31 continues to acquire sets of data for printed images while incrementing the count V for the skip label number counter until the count V following incrementation matches the value N+1. When V is equivalent to the value N+1 (S8: NO), in S9 the CPU 31 inspects the image printed on the current label based on the set of data for the printed image acquired just before the count V was last incremented.

Figure 4:
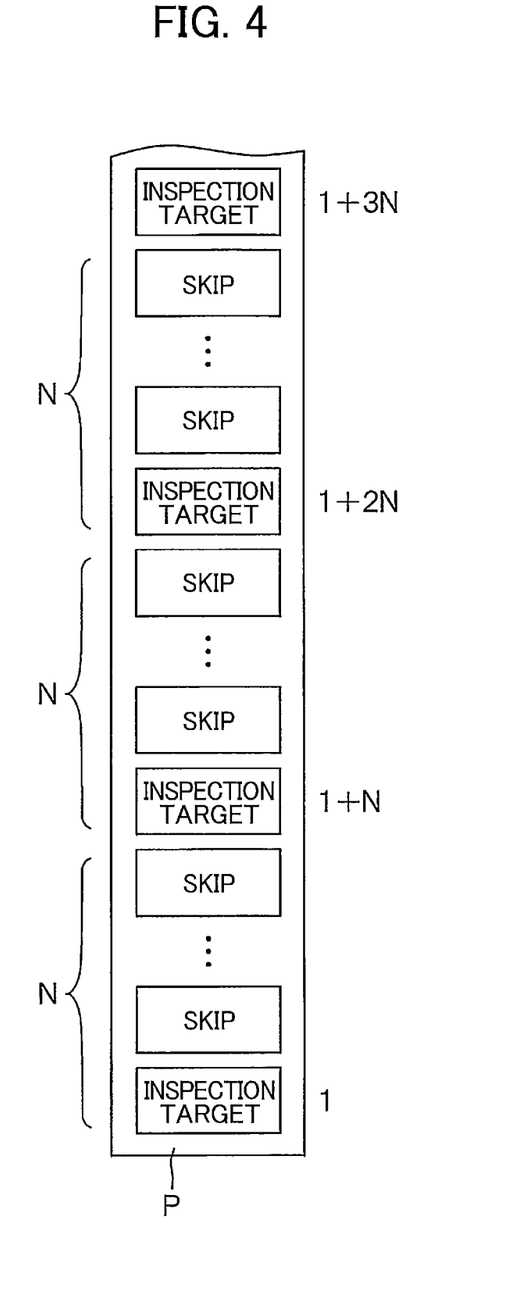
FIG. 4 is an explanatory diagram illustrating labels of inspection targets and labels for which inspection is skipped.

Through this process, after inspecting the label of the first page, the CPU 31 skips the number of labels equivalent to the skip number N following the first page and then inspects the label of the (N+1)-th page, as illustrated in FIG. 4.

After inspecting the label of the (N+1)-th page, in S10 the CPU 31 resets the count V for the skip label number counter to 0. In S11 the CPU 31 determines whether the result of the last inspection is "pass." When the inspection result is "pass" (S11: YES), in S12 the CPU 31 determines whether all labels to be inspected have been inspected. Here, labels to be inspected include the label on the first page and the label every skip number N following the label on the first page among all pages printed on the label paper P in the printing process.

In a case that inspection has not been completed for all labels to be inspected (S12: NO), the CPU 31 returns to S6 and acquires a set of data for the printed image on the label of the next page. Thereafter, the CPU 31 repeats the process described above, that is, in S7 the CPU 31 increments the count V of the skip label number counter and in S8 determines whether the count V is smaller than N+1. In a case that the count V is smaller than N+1, the CPU 31 acquires a set of data for the printed image on the next label. In a case that the count V reaches the value N+1 (S8: NO), in S9 the CPU 31 inspects the printed image on the label based on the set of image data acquired before the count V was last incremented.

Hence, as illustrated in FIG. 4, the CPU 31 sequentially sets the inspection target to the (1+m*N)-th page (where m is a natural number or 0) beginning from the first page and inspects the printed images on labels set as inspection targets.

In a case that the CPU 31 completes inspection of all labels positioned at intervals of the skip number N and all inspection results were "pass," the CPU 31 determines that the inspection process is complete (S12: YES) and ends the inspection process.

However, in a case that the CPU 31 determines in the inspection process that the inspection result for any label is "fail" (S5: NO or S11: NO), the CPU 31 performs an error process in S13 and subsequently ends the inspection process.

Skip Number Calculation Process

Figure 5:
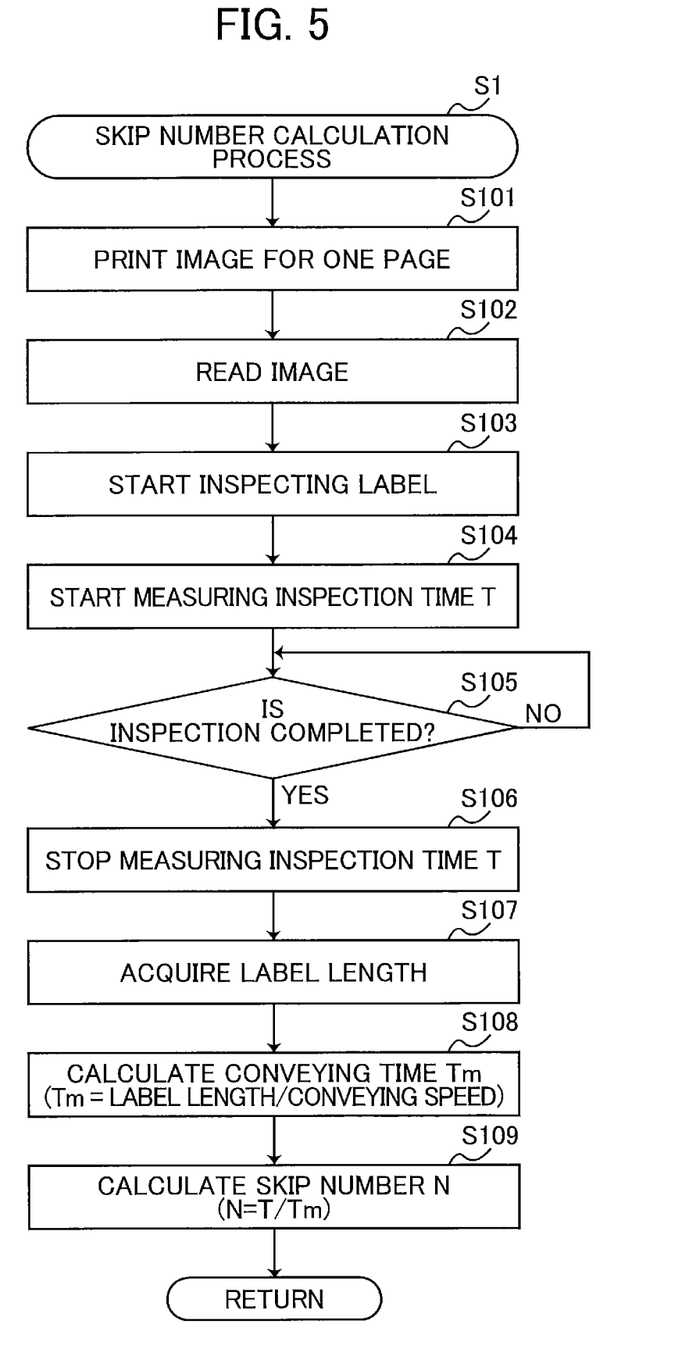
FIG. 5 is a flowchart illustrating a skip number calculation process according to the embodiment.

FIG. 5 illustrates steps in the skip number calculation process executed in S1 of FIG. 3.

In the skip number calculation process, the CPU 31 controls the motor M to start conveying the label paper P in the feed direction. While conveying the label paper P at a constant conveying speed, in S101 the CPU 31 controls the print head 21 to print an image for one page on a label of the label paper P.

In S102 the CPU 31 controls the CIS unit 22 to read the image printed on the label. In S103 the CPU 31 starts inspecting the label. At the same time that the CPU 31 starts inspection, in S104 the CPU 31 starts measuring the time required for inspecting the label (hereinafter called an inspection time T). In S105 the CPU 31 determines whether the inspection is complete and repeats the determination while the inspection is not complete (S105: NO). When inspection of the label is complete (S105: YES), in S106 the CPU 31 stops measuring the inspection time T.

In S107 the CPU 31 acquires a label length (the length of the label in the conveying direction) from data of the printed image read by the CIS unit 22, for example. In S108 the CPU 31 calculates a conveying time Tm for one label by dividing the label length by the conveying speed of the label paper label paper P (a known value). The conveying time Tm is the time required to convey the label a distance equivalent to the label length. In S109 the CPU 31 calculates the skip number N. The skip number N is calculated by dividing the inspection time T by the time Tm and by rounding up numbers to the right of the decimal in the quotient to the next whole number.

In a case that the CPU 31 can detect when the edge of a label has passed a prescribed position (the printing position of the print head 21, for example), the CPU 31 can measure the time required for the trailing edge of the label (the edge on the upstream side in the feed direction) to pass the prescribed position after the leading edge of the label (the edge on the downstream side in the feed direction) has reached the prescribed position. The CPU 31 can then set the conveying time Tm to the measured time.

Further, while the above example describes printing an image for one page on a label, the CPU 31 may print images for a plurality of pages on respective labels, measure the inspection time T for each label, and use the average time of all inspection times T to calculate the skip number N.

Figure 6A:
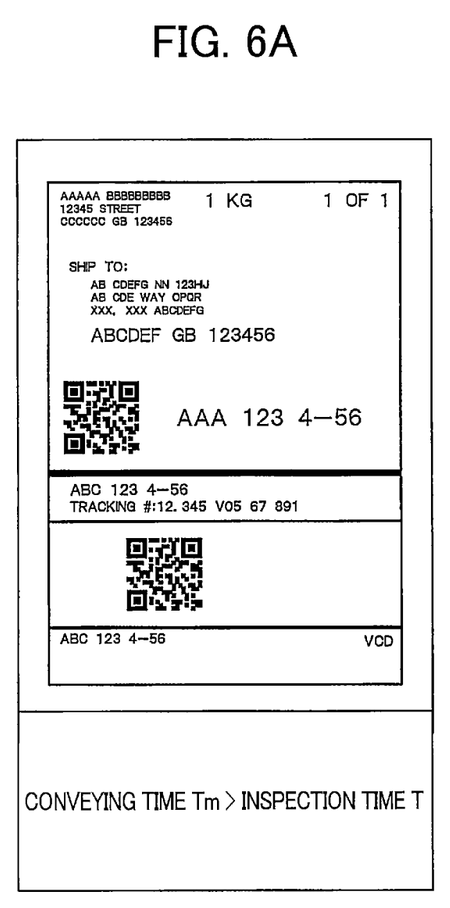
FIGS. 6A-6C are explanatory diagrams respectively illustrating various types of labels, conveying time, and inspection time.
Figure 6B:
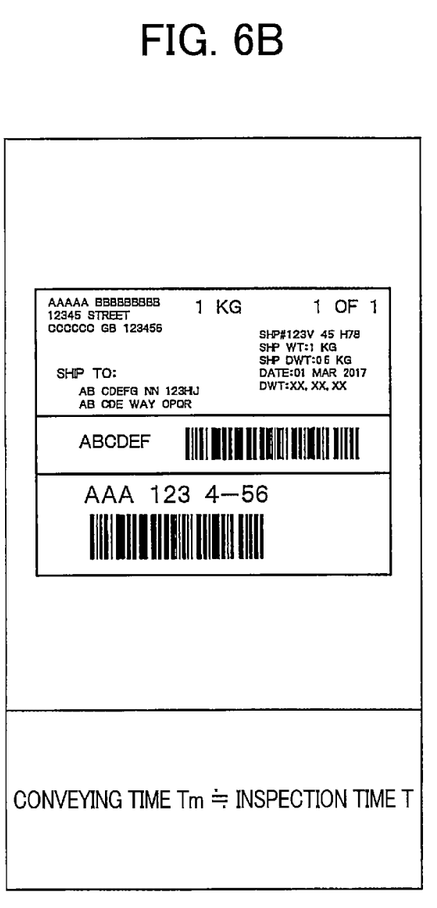
Figure 6C:
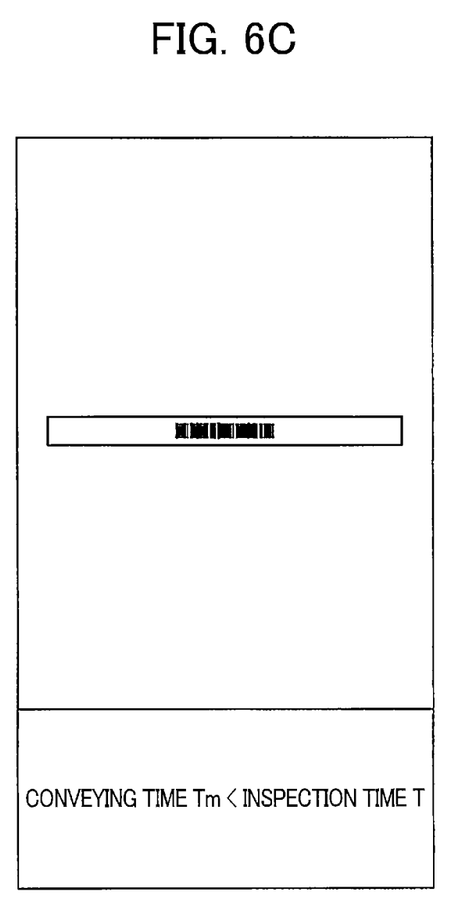

The lengths of labels and images printed on the labels vary widely. As illustrated in FIGS. 6A-6C, the relationship between the conveying time Tm required for conveying a label a distance equivalent to the label length and the inspection time T required to inspect the label differ from label to label. For example, the printed image on the label in FIG. 6A includes two two-dimensional codes. Thus, the printed image contains a lot of information. However, since the label is long, the inspection time T is shorter than the conveying time Tm. For the label shown in FIG. 6B, the inspection time T and conveying time Tm are substantially the same owing to the balance between the amount of information in the printed image and the label length. On the other hand, the printed image on the label shown in FIG. 6C includes only one barcode. Thus, the printed image contains little information. However, since the label is short, the inspection time T is longer than the conveying time Tm. In some cases when the inspection time T is longer than the conveying time Tm, the CPU 31 may not be able to inspect labels fast enough to keep up with conveyance, not only when inspecting all labels but even when skipping inspection for number of labels which is roughly determined.

Therefore, the CPU 31 finds the conveying time Tm and the inspection time T through measurements and sets the skip number N for the inspection process so that label inspection can keep up with conveyance, i.e., so that the time between the start of inspection on one label and the start of inspection on the next label is longer than or equal to the conveying time Tm.

Error Process

In a case that the inspection result on a label is determined to be "fail," the CPU 31 executes an error process. In this process, the CPU 31 halts the printing process and inspects labels for which inspection was skipped, i.e., labels between the label whose inspection result was "fail" and the last label whose inspection result was determined to be "pass."

Figure 7A:
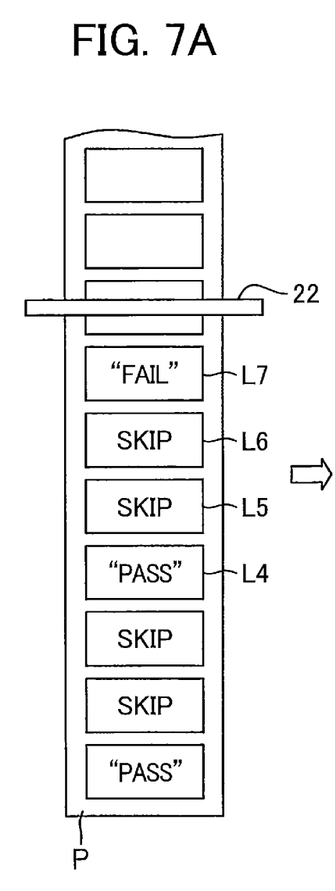
FIGS. 7A-7C are explanatory diagrams illustrating an error process.

In the example shown in FIG. 7A, the skip number N is 3 and the inspection result for the label of the seventh page was "fail." In this case, the CPU 31 sets the inspection targets to labels for the fifth and sixth pages L5-L6 interposed between the label of the seventh page L7 and the label of the fourth page L4, which was the last label whose inspection result was "pass," and inspects the labels for the fifth and sixth pages L5-L6.

As described above in the inspection process, sets of data for printed images read by the CIS unit 22 is temporarily stored in a prescribed area of the RAM 33 according to the FIFO method.

The CPU 31 uses these sets of data stored in the RAM 33 to inspect the labels that have been set as inspection targets in the error process, provided that the data is still stored in the RAM 33. Thus, in the example of FIG. 7A, the CPU 31 inspects labels for the fifth and sixth pages L5-L6 when data for the printed images on the labels of the fifth and sixth pages is still stored in the RAM 33.

Figure 7B:
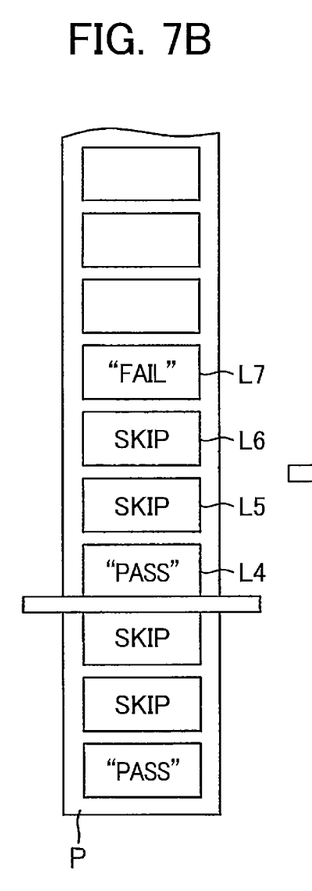

In some cases, sets of data for printed images on all labels that are inspection targets in the error process may not be stored in the RAM 33, depending on the relationship between the skip number N and the size of the prescribed area in the RAM 33. In such cases, the CPU 31 rewinds the label paper P until the printed image for the label of the inspection target set in the error process reaches the reading position of the CIS unit 22, as illustrated in FIG. 7B. Thereafter, the CPU 31 controls the CIS unit 22 to read the printed image of each label that is the inspection target in the error process (L5 and L6) and uses each set of data to inspect the target label.

Figure 7C:
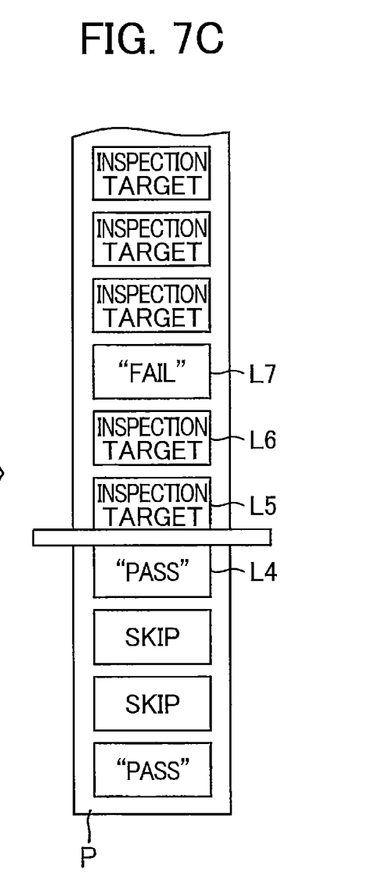

As illustrated in FIG. 7C, the CPU 31 also targets all printed labels upstream of the failed inspection result for inspection in the error process. That is, all printed labels upstream in the feed direction of the label paper P from the label whose inspection result was determined to be "fail" are set as inspection targets.

Note that when a detection result for a label is "fail," the CPU 31 may print the image "VOID" over the printed image whose printing result was "fail" so that the user can recognize that the label is unusable. In order to print the "VOID" image, the CPU 31 must rewind the label paper P after the error process.

Effects

According to the embodiment described above, an inspection process is performed to determine whether a printed image meets a given quality in a case that images are printed on a plurality of labels. In this inspection process, the CPU 31 sets some of the plurality of labels as inspection targets. Specifically, the inspection targets are set to the label of the first page and labels at intervals of a given number (N–1) on the upstream side in the feed direction from the label of the first page. The CPU 31 then inspects each label set as an inspection target to determine the quality of the printing results ("pass" or "fail"). This configuration takes less time to inspect labels than a configuration that inspects all of the labels. Accordingly, the label printer 1 of the embodiment can detect the quality of printing results without slowing the label printing speed (label conveying speed).

Further, the CPU 31 performs measurements to find the conveying time Tm required to convey the label a distance equivalent to the label length and the inspection time T required to inspect the label. For the inspection process, the CPU 31 sets the skip number N in order that label inspection can be performed in time with conveyance, i.e., so that the time between the start of inspection for one label and the start of inspection for the next label is longer than or equal to the conveying time Tm for the label. By setting an appropriate skip number N in this way, the CPU 31 can detect the quality of printing results for labels without slowing printing speed.

The CPU 31 performs the error process in the inspection process in a case that the inspection result of a label is determined to be "fail." In the error process, the CPU 31 halts the printing process and sets inspection targets to those labels between the label whose inspection result was determined to be "fail" and the last label whose inspection result was determined to be "pass." Since these labels set as inspection targets were not previously inspected in the inspection process, the CPU 31 can accurately determine whether the labels are usable or unusable by inspecting the labels in the error process.

In the error process, the CPU 31 sets inspection targets to all printed labels upstream in the feed direction of the label paper P from the label whose inspection result was determined to be "fail" in the inspection process for the following reason. In a case that a "fail" detection result occurs for a label, it is possible that other printed images do not meet the given quality. Hence, by setting the above-mentioned labels as inspection targets, the CPU 31 can avoid erroneous detections of poor quality printing results.

Another Example of the Inspection Process

Figure 8:
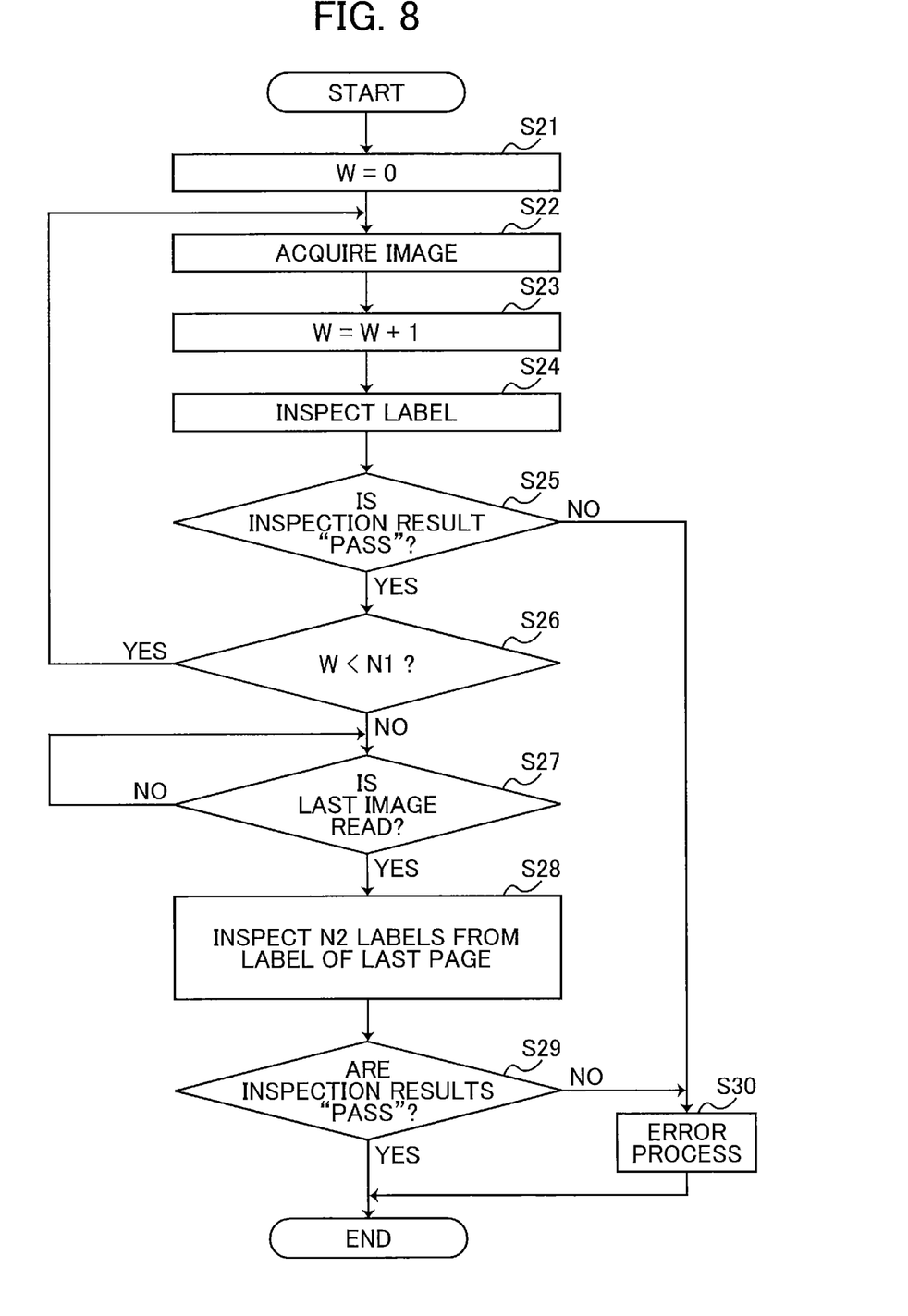
FIG. 8 is a flowchart illustrating an inspection process according to a modification.

The inspection process shown in FIG. 8 may be performed in place of the inspection process shown in FIG. 3.

In the inspection process of FIG. 8, the CPU 31 inspects a prescribed number N1 of labels including and upstream from the label of the first page and a prescribed number N2 of labels including and downstream from the label of the last page. Here, the label of the first page is the label farthest downstream in the feed direction among all labels printed by the print head 21, while the label of the last page is the label farthest upstream in the feed direction among all labels printed by the print head 21. Each of N1 and N2 is larger than or equal to 1.

More specifically, in S21 of FIG. 8 the CPU 31 resets a count W for an inspection label number counter to 0. The inspection label number counter is used to count the number of inspected labels. Next, the CPU 31 controls the CIS unit 22 to read the printed image on each label in sequence beginning from the label of the first page (the first label).

In S22 the CPU 31 acquires a set of data for the printed image on the label of the first page from the sets of data of printed images read by the CIS unit 22. In S23 the CPU 31 increments the count W of the inspection label number counter, and in S24 inspects the label of the first page based on the acquired set of data for the printed image.

In S25 the CPU 31 determines whether the inspection result for the label is "pass" or "fail." In a case that the inspection result is "pass" (S25: YES), in S26 the CPU 31 determines whether the count W of the inspection label number counter is smaller than the prescribed number N1. In a case that the count W is smaller than the prescribed number N1 (S26: YES), the CPU 31 returns to S22 to acquire a set of data for the printed image on the label of the next page. In S23 the CPU 31 again increments the count W of the inspection label number counter and in S24 inspects the printed label based on the acquired set of data for the printed image.

In this way, the CPU 31 continues to inspect each label in sequence beginning from the label of the first page until the count W of the inspection label number counter matches the prescribed number N1. When the count W matches the prescribed number N1 (S26: NO), in S27 the CPU 31 determines whether the CIS unit 22 has read the printed image for the label of the last page to be printed in the printing process, that is, the CPU 31 determines whether the CIS unit 22 has completed reading the printed images.

The CPU 31 repeatedly performs the determination in S27 while the CIS unit 22 has not finished reading the last printed image (S27: NO). When the CIS unit 22 has completed reading the printed image for the label of the last page (S27: YES), in S28 the CPU 31 acquires sets of data for printed images of the prescribed number N2 of labels continuously arranged from the label of the last page to the label of (N2–1) pages prior to the last page as inspection targets. Subsequently, the CPU 31 inspects the prescribed number N2 of labels from the label of the last page to the label of (N2–1) pages prior to the last page based on the acquired sets of data.

In S29 the CPU 31 determines whether the inspection result was "pass" for all the N2 number of labels from the label of the last page to the label upstream from the last page by (N2–1) pages. In a case that all inspection results were "pass" (S29: YES), the CPU 31 ends the inspection process.

However, in a case that the CPU 31 determines in the inspection process that the inspection result for a label is "fail" (S25: NO or S29: NO), the CPU 31 performs an error process in S30 and subsequently ends the inspection process. The error process in S30 is identical to the error process described in the embodiment.

Variation of the Inspection Process

In some cases, a set of data of a printed image for each of the prescribed number N2 of labels from the label on the last page to the label of the page (N2−1) pages prior to the last page cannot be stored in the RAM 33 because the storage capacity of the RAM 33 is too small. In such cases, a portion of the inspection process shown in FIG. 8 may be replaced with the process shown in FIG. 9.

Figure 9:
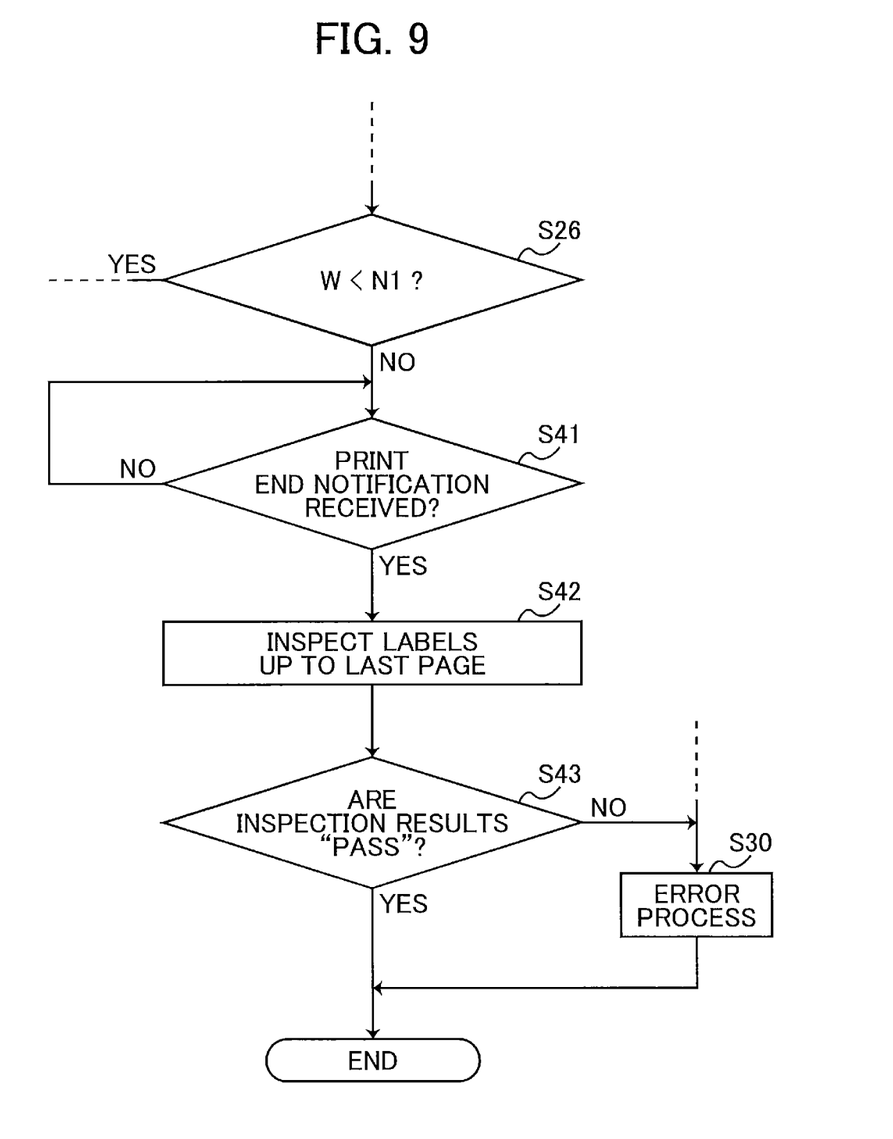
FIG. 9 is a flowchart illustrating an inspection process according to a modification.

In the process shown in FIG. 9, once the CPU 31 has inspected the prescribed number N1 of labels from the label on the first page and determines in S26 that the count W of the inspection label number counter is equivalent to the prescribed number N1 (S26: NO), in S41 the CPU 31 determines whether a print end notification was received from the external terminal.

While a print end notification has not been received (S41: NO), the CPU 31 continues to repeat the determination in S41. Here, a time lag occurs after a print end notification is received and before the print head 21 halts the printing operation and the label of the last page reaches the reading position of the CIS unit 22. Therefore, when the CPU 31 determines in S41 that a print end notification was received (S41: YES), in S42 the CPU 31 sets labels for all subsequent pages that can be read by the CIS unit 22 from a time that YES determination is made in S41 up to the last page as inspection targets and inspects the labels of the inspection targets based on the sets of data of the printed images read by the CIS unit 22.

In a case that the inspection results for all labels of targets are "pass" (S43: YES), the CPU 31 ends the inspection process. However, in a case that the inspection result for any label is "fail" (S43: NO), in S30 the CPU 31 performs the error process and subsequently ends the inspection process. The error process in S30 is identical to that described in the embodiment.

Another Variation of the Inspection Process

By replacing a portion of the inspection process shown in FIG. 8 with the process shown in FIG. 9, the CPU 31 can inspect labels for a few pages downstream of the last page in the feed direction, even when the storage capacity of the RAM 33 is small. However, in some cases of the process shown in FIG. 9, the CPU 31 cannot inspect each of the prescribed number N2 of labels from the label of the last page to the label of the page (N2−1) pages prior to the last page. Hence, when it is desirable to inspect each of the prescribed number N2 of labels from the label of the last page to the label of the page (N2−1) pages prior to the last page despite the RAM 33 having a small storage capacity, a portion of the inspection process shown in FIG. 8 may be replaced with the process shown in FIG. 10.

Figure 10:
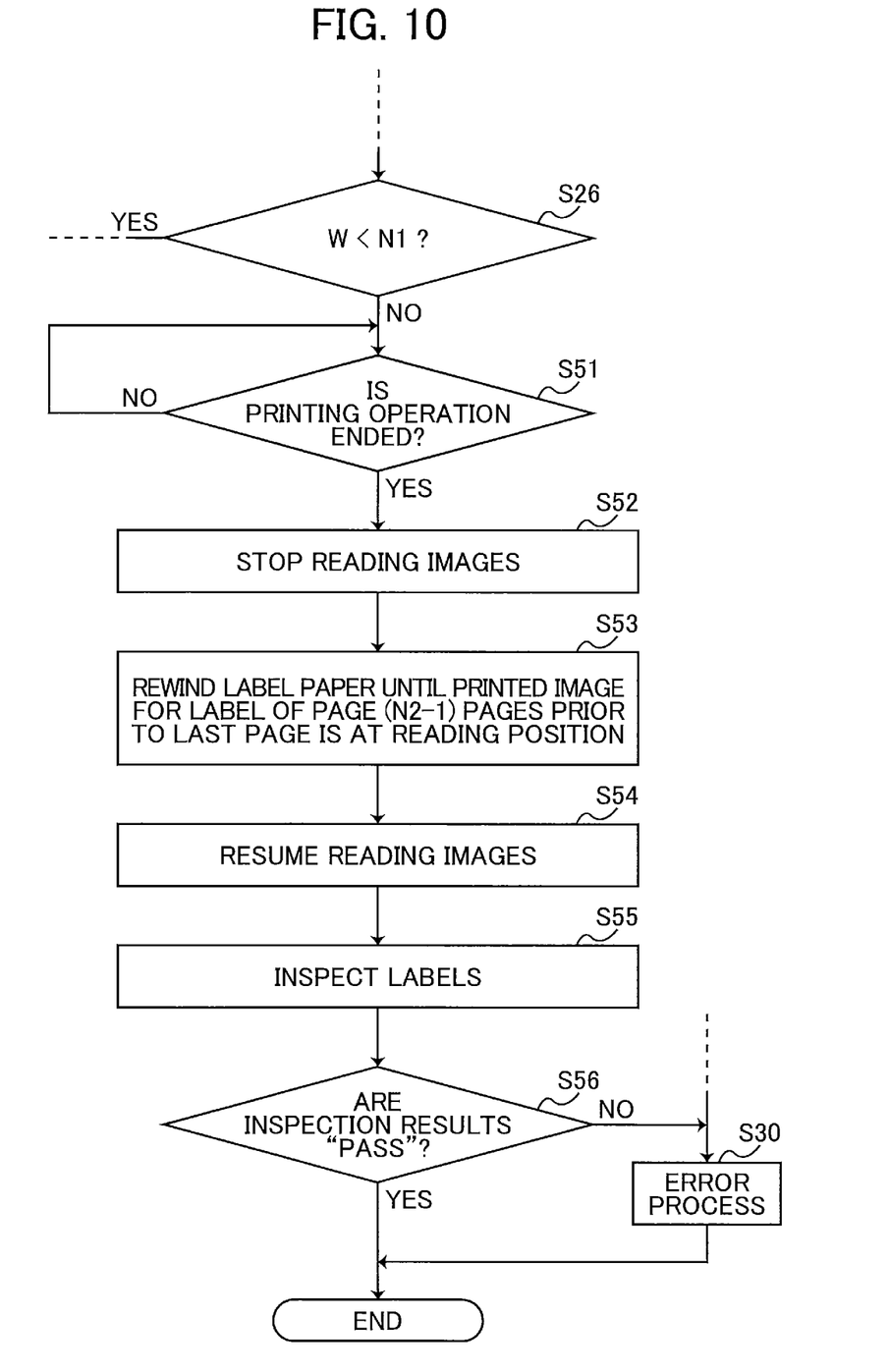
FIG. 10 is a flowchart illustrating an inspection process according to a modification.

In the process shown in FIG. 10, once the CPU 31 has inspected each of the prescribed number N1 of labels continuously arranged from the first page and the count W of the inspection label number counter is equivalent to the prescribed number N1 (S26: NO), in S51 the CPU 31 determines whether the printing operation of the print head 21 has ended.

While the printing operation has not ended (S51: NO), the CPU 31 repeats the determination in S51. When the printing operation by the print head 21 has ended (S51: YES), in S52 the CPU 31 controls the CIS unit 22 to stop reading printed images. In S53 the CPU 31 drives the motor M to rotate in reverse in order to rewind the label paper P until the printed image for the label (N2−1) pages prior to the last page is at the reading position of the CIS unit 22. According to this rewinding operation of S53, the CIS unit 22 can read the prescribed number N2 of labels arranged continuously from the label of the last page to the label of the page (N2−1) pages prior to the last page. Subsequently, in S54 the CPU 31 drives the motor M to rotate forward and controls the CIS unit 22 to resume reading images.

In S55 the CPU 31 inspects each label based on the corresponding set of data of the printed images read by the CIS unit 22 after the time that reading images is resumed. In a case that the inspection results for all labels are "pass" (S56: YES), the CPU 31 ends the inspection process. However, in a case that the inspection result for any label of the target is "fail" (S56: NO), in S30 the CPU 31 performs the error process and subsequently ends the inspection process. The error process is identical to that described in the embodiment.

Another Example of the Skip Number Calculation Process

Figure 11:
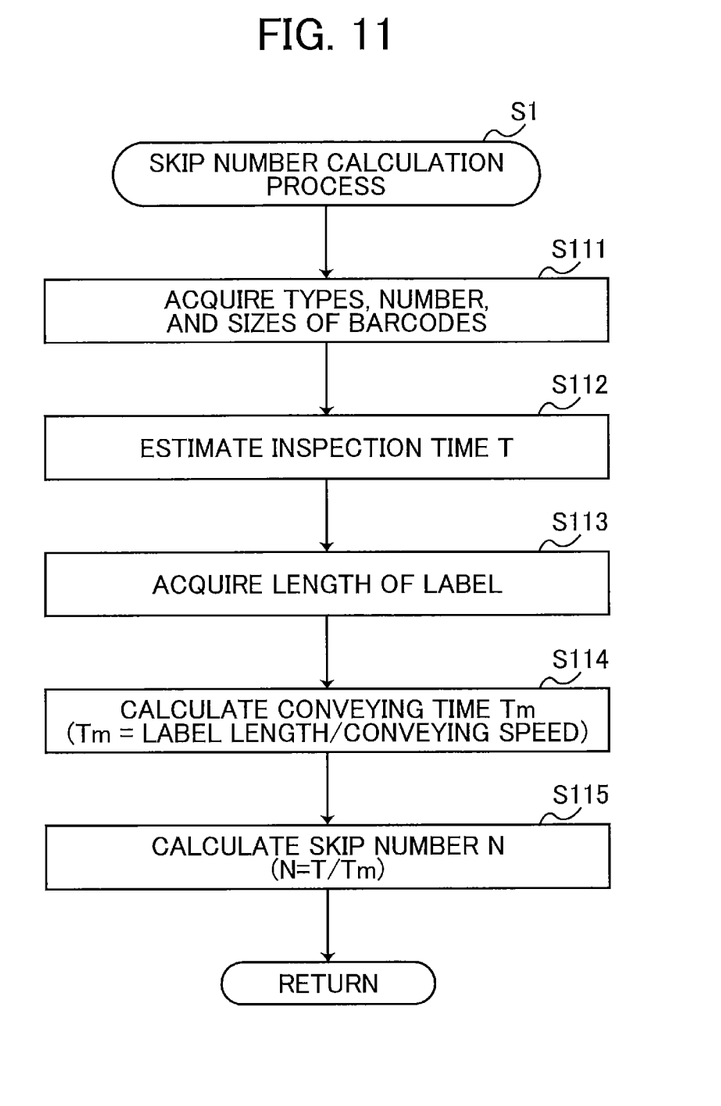
FIG. 11 is a flowchart illustrating a skip number calculation process according to a modification.

The skip number calculation process shown in FIG. 11 may be executed in place of the skip number calculation process in FIG. 5.

In the process of FIG. 5, the CPU 31 performs actual measurements to find the conveying time Tm required for conveying the label a distance equivalent to the label length, and the inspection time T required to inspect the label. However, in the skip number calculation process of FIG. 11, the CPU 31 estimates rather than measures the conveying time Tm and the inspection time T.

Specifically, in S111 at the beginning of the process in FIG. 11, the CPU 31 analyzes the printer control command that the label printer 1 received from the external terminal and acquires the types, the number, and the sizes of barcodes included in the image to be printed on the label. In S112 the CPU 31 estimates the inspection time T based on the types, number, and sizes of barcodes acquired in S111.

The processing load on the CPU 31 for inspecting labels in which barcodes are printed varies according to the types of barcodes included in the image. Further, the more barcodes an image includes, the more time the inspection for the label on which the image was printed requires. Moreover, the larger the sizes of the barcodes the image has, the more time the inspection for the label on which the image was printed requires. Therefore, the CPU 31 sets the types of barcodes, the number of barcodes, and the sizes of barcodes included in the image as parameters and acquires the time required to inspect the image with these parameters based on previously conducted experiments. In this way, the CPU 31 can estimate the inspection time T based on the types, sizes, and number of barcodes included in an image to be printed on a label.

In S113 the CPU 31 acquires the length of the label in the conveying direction from the image data acquired by analyzing the printer control command. In S114 the CPU 31 divides the label length by the predetermined conveying speed of the label paper P to calculate the conveying time Tm for one label, i.e., the time required to convey the label a distance equivalent to its length. In S115 the CPU 31 divides the inspection time T by the conveying time Tm and rounds up numbers to the right of the decimal in the quotient to the next whole number to calculate the skip number N.

Other Variations

While the present disclosure has been described according to an embodiment thereof, the present disclosure can be implemented in other forms.

For example, in the inspection process of FIG. 8, a prescribed number N2 of labels downstream of and including the label of the last page, which is positioned farthest upstream in the feed direction, are set as inspection targets. However, the CPU 31 may consider how much space is available in the RAM 33 for storing sets of data of printed images to be used for inspecting labels and may set the number N2 to the number of pages of printed images whose sets of data can be stored in the available space. This method can eliminate the need to rewind the label paper P and to reread the prescribed number N2 of labels.

In the error process shown in FIGS. 7A-7C, the CPU 31 inspects all labels between the label whose inspection result was determined to be "fail" and the last label having a "pass" inspection result. However, the CPU 31 may be configured to give a "fail" result to all labels printed after the last label having a "pass" inspection result without inspecting those labels, thereby reducing the time required for the error process.

The embodiment describes a case in which the CPU 31 executes all processes on the label printer 1. However, the label printer 1 may be provided with a plurality of CPUs that work in concert to execute these processes.

In the embodiment described above, the CPU 31 determines whether barcode symbols printed on a label satisfy a given quality. However, the CPU 31 may also inspect the quality of printed images other than barcode symbols, such as character strings or other graphic images. Further, the method of inspection may be a method of comparing the print data on which printing the image is based to the set of data of the printed image read by the CIS unit 22.

In the embodiment and variations described above, the skip number N is set through calculation or estimation. However, the skip number N may be inputted or otherwise set by the user using the label printer 1 or may be a preset value based on the conveying speed of the label paper P.

The reading unit is not limited to the CIS unit 22, but may be any device configured to read images, such as charge-coupled devices (CCDs).

Any steps or process executed in the embodiment and variations can combined.

While the disclosure has been described in detail with reference to the specific embodiment thereof, it would be apparent to those skilled in the art that various changes and modifications may be made therein without departing from the scope of the invention.

What is claimed is:

1. A printer comprising:
a conveyer configured to convey a sheet in a conveying direction;
a printing portion configured to print an image in a printing area of the sheet conveyed by the conveyer;
a reader located downstream of the printing portion in the conveying direction, the reader being configured to read the image in the printing area printed by the printing portion; and
a controller configured to perform:
in a case that the printing portion is to print images in a plurality of printing areas of the sheet, setting, as at least one target printing area, a part of the plurality of printing areas so that at least one of the plurality of printing areas is excluded from the at least one target printing area; and
determining whether a printing result in each of the at least one target printing area satisfies a prescribed quality based on image data which is generated by reading the printing result by using the reader,
wherein the controller does not make a determination as to the prescribed quality being satisfied for a printing result of the at least one of the plurality of printing areas excluded from the at least one target printing area.

2. The printer according to claim 1, wherein the plurality of printing areas is arranged in the conveying direction,
wherein in the setting a part of the plurality of printing areas, the controller sets, as target printing areas, printing areas at intervals of a prescribed number of printing areas from among printing areas located upstream from a specific printing area in the conveying direction.

3. The printer according to claim 2, wherein in the setting a part of the plurality of printing areas, the controller performs:
measuring a time period from a reading start time to a determination completion time, the reading start time being a time that the reader starts reading all of one or more printing areas located upstream from a farthest-downstream printing area in the conveying direction, the determination completion time being a time that determination as to whether printing results satisfy the prescribed quality is complete for all of the one or more printing areas, the farthest-downstream printing area being located at farthest downstream in the conveying direction among the plurality of printing areas; and
setting the prescribed number by comparing the measured time period with a time period required to print an image in one printing area.

4. The printer according to claim 2, wherein an image to be printed in one of the plurality of printing areas includes one or more barcodes,
wherein in the setting a part of the plurality of printing areas, the controller sets the prescribed number based on at least one of a type of one of the one or more barcodes, number of the one or more barcodes, a size of one of the one or more barcodes, a conveying speed of the sheet, and a length of the one of the plurality of printing areas in the conveying direction.

5. The printer according to claim 1, wherein in the setting a part of the plurality of printing areas, the controller at least sets, as target printing areas, a farthest-upstream printing area and a farthest-downstream printing area from among the plurality of printing areas, the farthest-upstream printing area being located farthest upstream in the conveying direction among the plurality of printing areas, the farthest-downstream printing area being located farthest downstream in the conveying direction among the plurality of printing areas.

6. The printer according to claim 5, wherein in the setting a part of the plurality of printing areas, the controller sets, as target printing areas, one or more first printing areas located downstream from the farthest-upstream printing area and one or more second printing areas located upstream from the farthest-downstream printing area from among the plurality of printing areas.

7. The printer according to claim 6, further comprising a storage configured to store a set of image data representing an image read by the reader, wherein in the setting a part of the plurality of printing areas, the controller sets number of printing areas to be set as one or more target printing areas, based on available capacity of the storage.

8. The printer according to claim 6, wherein the controller is configured to further perform:
receiving sets of data in a prescribed order, each of sets of data representing images to be printed on the plurality of printing areas, the received sets of data including a last set of data which is lastly received; and
sequentially printing the images based on the received sets of data according to the prescribed order in which the sets of data is received,
wherein in the setting a part of the plurality of printing areas, the controller sets one or more target printing areas from among printing areas which are read by the reader from a time that the last set of data is received.

9. The printer according to claim 6, wherein the controller is configured to further perform:
after the plurality of printing areas are printed, controlling the conveyer to convey the sheet in an opposite direction to the conveying direction; and
after the controlling the conveyer is performed, controlling the conveyer to re-convey the sheet in the conveying direction,
wherein in the determining, the controller is configured to perform:
controlling the reader to read an image in each readable printing area which can be read from among the one or more first printing areas while the controlling the conveyer to re-convey the sheet is performed such that a set of read data corresponding to the each readable printing area is generated; and
determining whether a printing result in the each readable printing area whose image is read while the controlling the conveyer to re-convey the sheet is performed satisfies the prescribed quality based on the corresponding set of read data.

10. The printer according to claim 1, wherein in a case that the controller determines that a printing result in a certain printing area does not satisfy the prescribed quality, the controller is configured to perform:
controlling the printing portion to stop printing; and
additionally determining whether a printing result in one or more intermediate printing areas satisfies the prescribed quality, the one or more intermediate printing areas being located between the certain printing area and a printing area in which a printing result is lastly determined to satisfy the prescribed quality, the additionally determining being based on one or more sets of data generated by reading each printing result in one or more intermediate printing areas.

11. The printer according to claim 10, wherein in the additionally determining, the controller is configured to determine whether each of printing results in printing areas located upstream to the certain printing area in the conveying direction satisfies the prescribed quality.

12. The printer according to claim 10, further comprising a storage configured to store a set of image data representing an image read by the reader,
wherein in the additionally determining, the controller is configured to perform:
in a case that the storage stores a set of specific image data representing an image in a specific printing area, determining whether a printing result in the specific printing area satisfies the prescribed quality based on the set of specific image data stored in the storage; and
in a case that the storage does not store the set of specific image data,
controlling the conveyer to convey the sheet in an opposite direction to the conveying direction;
after the controlling the conveyer is performed, controlling the reader to read the image printed in the specific printing area to generate a set of read data; and
determining whether the printing result in the specific printing area satisfies the prescribed quality based on the set of read data.

13. The printer according to claim 1, wherein in a case that the controller determines that a printing result in a certain printing area does not satisfy prescribed quality, the controller is configured to perform:
controlling the printing portion to stop printing; and
determining that a printing result in each of one or more intermediate printing areas does not satisfy the prescribed quality, the one or more intermediate printing areas being located between the certain printing area and a printing area in which a printing result is lastly determined to satisfy the prescribed quality.

14. The printer according to claim 1, wherein the image read by the reader includes a barcode.

* * * * *